US012162724B2

(12) United States Patent
Roth et al.

(10) Patent No.: US 12,162,724 B2
(45) Date of Patent: Dec. 10, 2024

(54) SYSTEMS AND METHODS FOR DISPLAYING CABIN OPERATING PANELS IN ELEVATOR CABS BASED ON POSITIONS OF PASSENGERS

(71) Applicant: TK Elevator Innovation and Operations GmbH, Düsseldorf, DE (US)

(72) Inventors: Sergio Roth, Porto Alegre (BR); Andrew Evert, Atlanta, GA (US); Nejib Masghouni, Chamblee, GA (US); Alison Powers, Atlanta, GA (US); Viktor Scheinmann, Erkrath, DE (US)

(73) Assignee: TK ELEVATOR INNOVATION AND OPERATIONS GMBH, Düsseldorf (DE)

( * ) Notice: Subject to any disclaimer, the term of this patent is extended or adjusted under 35 U.S.C. 154(b) by 1375 days.

(21) Appl. No.: 16/736,246

(22) Filed: Jan. 7, 2020

(65) Prior Publication Data

US 2021/0206598 A1 Jul. 8, 2021

(51) Int. Cl.

*B66B 1/46* (2006.01)
*B66B 1/34* (2006.01)
*B66B 5/00* (2006.01)

(52) U.S. Cl.

CPC ............ *B66B 1/467* (2013.01); *B66B 1/3492* (2013.01); *B66B 1/463* (2013.01); *B66B 1/468* (2013.01);

(Continued)

(58) Field of Classification Search

CPC ....... B66B 1/467; B66B 1/3492; B66B 1/463; B66B 1/468; B66B 5/005;

(Continued)

(56) References Cited

U.S. PATENT DOCUMENTS 4,365,691 A * 12/1982 Bevilaqua .............. H01H 13/84 187/395
7,021,428 B2 4/2006 Han (Continued)

FOREIGN PATENT DOCUMENTS

CN 107735348 A 2/2018
CN 208150715 U 11/2018

(Continued)

OTHER PUBLICATIONS

Extended European Search Report, dated May 14, 2021, in European counterpart application No. EP 20217033.8.

(Continued)

*Primary Examiner* — Jeffrey Donels
(74) *Attorney, Agent, or Firm* — Dinsmore & Shohl LLP

(57) ABSTRACT

An elevator system may include an elevator car that is configured to transport a passenger between floors of a building as well as a sensor system in the elevator car that is configured to detect a passenger's location, orientation, and/or height. The elevator system may further include a touchscreen that can display a virtual car operating panel at a location on the touchscreen that is based on the location, orientation, and/or height of the passenger. The virtual car operating panel may be configured to receive input from the passenger regarding a destination floor. The touchscreen may be configured to display a virtual car operating panel for each passenger based on each passenger's location, orientation, and/or height on the elevator car.

22 Claims, 8 Drawing Sheets

(52) U.S. Cl.
CPC ........ *B66B 5/005* (2013.01); *B66B 2201/463* (2013.01)

(58) Field of Classification Search
CPC ... B66B 2201/463; B66B 3/00; B66B 1/3461; B66B 3/008; B66B 5/0018
See application file for complete search history.

(56) References Cited

U.S. PATENT DOCUMENTS

| | | | | |
|---|---|---|---|---|
| 7,434,667 | B2 | 10/2008 | Mehr | |
| 8,714,448 | B2 | 5/2014 | Lutz | |
| 10,732,721 | B1 * | 8/2020 | Clements | B66B 1/468 |
| 2003/0218643 | A1 | 11/2003 | Sakata | |
| 2018/0162688 | A1 * | 6/2018 | Troesch | B66B 1/468 |
| 2018/0201475 | A1 * | 7/2018 | Atsushi Kotsubo | B66B 3/002 |
| 2018/0339878 | A1 * | 11/2018 | Fever | B66B 1/50 |
| 2018/0370758 | A1 * | 12/2018 | Huang | B66B 1/50 |
| 2019/0146128 | A1 | 5/2019 | Cao | |
| 2019/0284020 | A1 * | 9/2019 | Gireddy | B66B 1/468 |

FOREIGN PATENT DOCUMENTS

| | | | | |
|---|---|---|---|---|
| CN | 108928720 | A | 12/2018 | |
| EP | 1241125 | A1 | 9/2002 | |
| EP | 3299323 | A1 * | 3/2018 | B66B 1/467 |
| EP | 3401258 | A1 * | 11/2018 | |
| EP | 3406554 | A1 * | 11/2018 | B66B 1/463 |
| JP | 2011051719 | A | 3/2011 | |
| JP | 2013245079 | A | 12/2013 | |
| JP | 2014015318 | A | 1/2014 | |
| JP | 5774170 | B | 9/2015 | |
| JP | 2017001767 | A | 1/2017 | |
| JP | 2018002428 | A | 1/2018 | |
| WO | 01/096224 | A1 | 12/2001 | |
| WO | 2019043061 | A | 3/2019 | |
| WO | WO-2020152859 | A1 * | 7/2020 | |

OTHER PUBLICATIONS

Fabio Liberali et al., “Gateway, the magic mirror: IoT application for lift cars”, LU-VE Group, Italy, pp. 1-13 (Dec. 2018).
First Office Action, dated Apr. 14, 2022, in Chinese counterpart Application No. CN202110011769.3, citing the above listed prior art references that have not yet been listed in a prior filed IDS. (No. English translation available).

* cited by examiner

SYSTEMS AND METHODS FOR DISPLAYING CABIN OPERATING PANELS IN ELEVATOR CABS BASED ON POSITIONS OF PASSENGERS

FIELD

The present disclosure generally relates to elevators, including systems and methods for displaying one or more cabin operating panels within an elevator cab based on the position of one or more passengers within the elevator cab.

BACKGROUND

Elevator cars include car operating panels (COPs) that passengers utilize to specify desired destinations. Elevator manufacturers have recently started including interactive touch-based COPs on the walls of elevator cars to modernize elevator cars and to improve visibility and access to COPs. Yet access to interactive touch-based COPs in elevator cars remains problematic. For example, passengers still have trouble accessing the COP in a crowded elevator car. As another example, passengers still have to move around within an elevator car to access the COP or the portion of the COP that is needed. As still another example, the COPs of many elevator cars are positioned too high or too low for passengers with disabilities. Likewise, the COPs of many elevator cars are positioned too high or too low for passengers that fall outside of an average-height range. Some of these shortfalls with existing COPs are particularly problematic in view of laws such as the Americans with Disabilities Act (ADA) and the Architectural Barriers Act (ABA).

Thus a need exists for systems and methods where virtual COPs in elevator cars are easily accessible to all passengers, including passengers with above-average heights and passengers with below-average heights.

SUMMARY

In some examples, an elevator system may generally include an elevator car for transporting passengers between floors of a building, as well as a screen disposed in the elevator car. The screen may in some cases be a touchscreen with a pressure sensitive surface that is LED-backlit and can receive input from passengers regarding, at the very least, destination floors. In some instances, the screen may be configured to display a virtual display panel, such as a virtual car operating panel (COP), for example, only after a passenger interacts with or touches the screen. Once the passenger interacts with or touches the screen, the screen may display the virtual display panel at a location at which the passenger first interacted with or touched the screen. Needless to say, this location will be higher for taller passengers and lower for shorter passengers. To encourage passengers to interact with or touch the screen as they enter the elevator car, the screen may display one or more visual prompts such as fingertips, hands, and/or text that says "touch here," for example.

Other example elevator systems may generally include an elevator car, a screen, and a sensor system. The sensor system may be disposed in the elevator car and may detect a location, an orientation, and/or a height of a passenger that is entering or present in the elevator car. Some example sensor systems include one or more object detection sensors disposed at various locations throughout the elevator car. Several examples of object detection sensors include cameras, depth sensors, infrared sensors, and imaging luminance meters. Notwithstanding, this information about the passenger may be relayed periodically to the screen or, more precisely, the screen's controller, which may control the content displayed on the screen. The screen may then display a virtual display panel at a location on the screen that is based on the location, the orientation, and/or the height of the passenger in the elevator car. The location of the virtual display panel may be adjusted on the screen if the passenger turns or moves within the elevator car. Indeed, the screen may display as many virtual display panels as there are passengers in the elevator car, and the location of each virtual display panel may be based on the location, the orientation, and/or the height of each respective passenger. It should be understood that the screen controller may be in communication with an elevator controller that controls movement of the elevator car between the floors of the building. Hence when a passenger requests a destination floor on a virtual display panel, the screen controller can relay this request to the elevator controller.

The present disclosure contemplates a wide variety of ways in which to operate screens in elevator cars. In some examples, a screen in the elevator car may be configured to display a virtual display panel before a passenger enters the elevator car. Once the passenger enters the elevator car the screen may adjust the location of the virtual display panel based on information that the sensor system detects about the passenger's location, orientation, and/or height. In other examples, the screen may wait to display a virtual display panel until the sensor system has provided information about the passenger's location, orientation, and/or height.

The example screens disclosed herein are not limited to displaying virtual display panels. Rather, one or more screens in an elevator car may display a variety of media content with which passengers can interact while they are being transported to their respective destination floors. For instance, a screen may display notifications, advertisements, social media, photos, web pages, news briefs, weather forecasts, traffic reports, video clips, and so on. The screen may also offer entertainment options such as a photobooth or a GIF generator that generates media that can be sent to passengers. Media content may be displayed, for example, after a passenger selects a destination floor and the virtual display panel fades from the screen. The media content that the screen controller displays may be based at least in part on the floor to which the passenger requests to travel. Alternatively or additionally, the screen may display such media content alongside, above, and/or below virtual display panels. By way of example, media content intended for children may be displayed in the lower third of the screen before and after a passenger selects a destination floor on a virtual display panel. Still further, when an elevator car is removed from service, the screen(s) in the elevator car may even display information that assists a service technician to service the elevator system.

DETAILED DESCRIPTION

Although certain example methods and apparatuses are described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claim need not necessarily be performed in the order in which they are recited, unless so required by the context of the claims. In addition, all references to one skilled in the art shall be understood to refer to one having ordinary skill in the art. With respect to the drawings, it should be understood that not all components are drawn to scale. Furthermore, those having ordinary skill in the art will understand that the various examples disclosed herein should not be considered in isolation. Rather, those with ordinary skill in the art will readily understand that the disclosure relating to some examples may be combined with and/or equally applicable to the disclosure relating to other examples.

Figure 1:
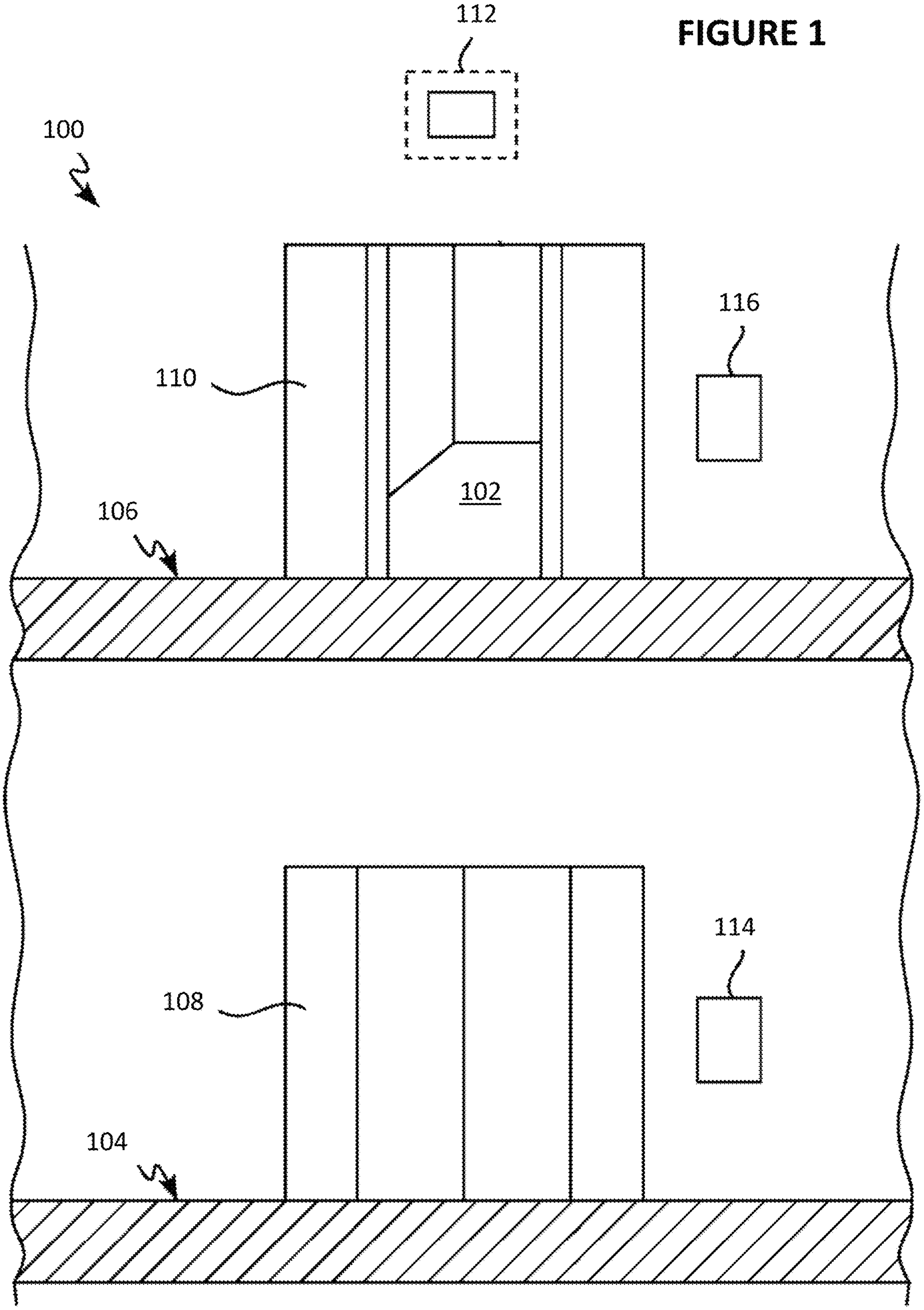
FIG. 1 is a schematic sectional view of two floors of a building that has an example elevator system, with an inside of an example elevator car shown in perspective view for purposes of illustration only.

With reference to FIG. 1, an example elevator system 100 may include an elevator car 102 configured to travel between floors 104, 106 of a building. Although FIG. 1 shows only a first floor 104 and a second floor 106, it should be understood that the elevator car 102 can travel to and access many or all floors of a building. Notwithstanding, the floors 104, 106 accessed by the elevator car 102 may include doors 108, 110 that open and close to allow passengers into and out of the elevator car 102 when the elevator car 102 stops at the various floors 104, 106. An elevator controller 112 may control movement of the elevator car 102 between the floors 104, 106. The elevator controller 112 may be in communication with one or more call panels 114, 116 that are located outside the elevator car 102 at each floor 104, 106. For example, FIG. 1 depicts a first call panel 114 at the first floor 104 and a second call panel 116 at the second floor 106. The call panels 114, 116 may be configured to receive input from a passenger and transmit the input to the elevator controller 112, which in turn causes the elevator car 102 to move accordingly.

Figure 2:
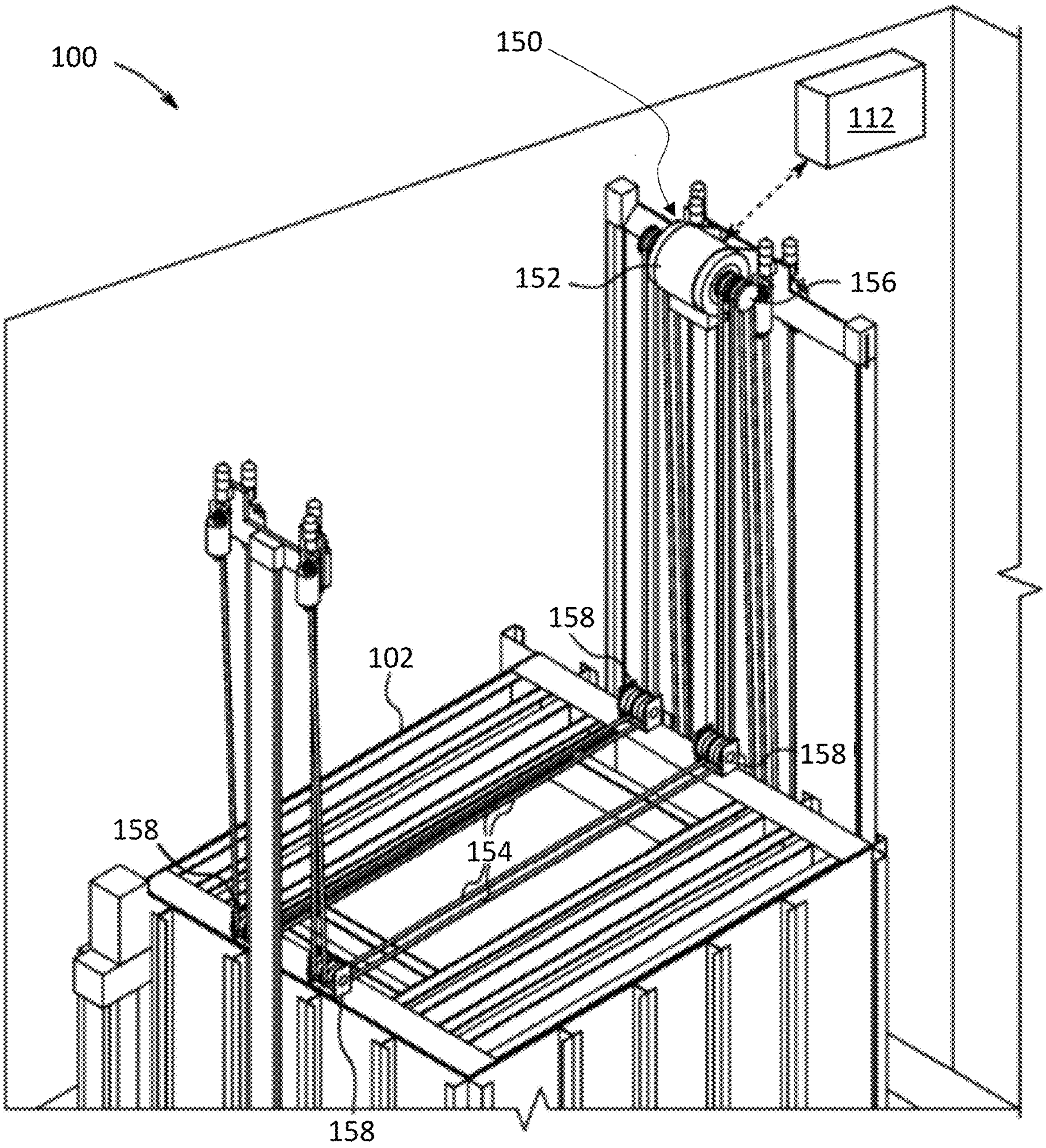
FIG. 2 is a perspective view of an example drive assembly of the elevator system shown in FIG. 1.

Referring now to FIG. 2, the elevator controller 112 may be in communication with an elevator drive assembly 150 that includes a drive motor 152. In some examples, the elevator drive assembly 150 may be a traction belt drive system that includes one or more tension members 154 that connects the elevator car 102 to a counterweight. One or more of the tension members 154 may be frictionally engaged to a drive sheave 156 coupled to the drive motor 152. Actuation of the drive motor 152 by the elevator controller 112 may cause rotation of the drive sheave 156 and hence movement of the elevator car 102 along a travel path. The tension members 154 may be routed around any number of idler sheaves 158, for example, to alter the direction of the tension force applied by the tension members 154 on the elevator car 102 and the counterweight.

Those having ordinary skill in the art will recognize that the present disclosure is not at all limited to the example elevator drive assembly 150 shown in FIG. 2. Although the example elevator system 100 is shown and described to include the tension members 154 and the drive sheave 156, elevator systems of the present disclosure may employ countless alternative or additional mechanisms and methods for moving elevator cars within elevator shafts. By way of example, the elevator drive assembly may be a hydraulic system in which a drive motor is coupled to a pump such that actuation of the drive motor by a controller causes the pump to circulate fluid to one or more hydraulic cylinders that extend and retract to move an elevator car vertically and/or horizontally. Still another non-limiting example involves moving an elevator car along rails by way of linear motors.

Figure 3:
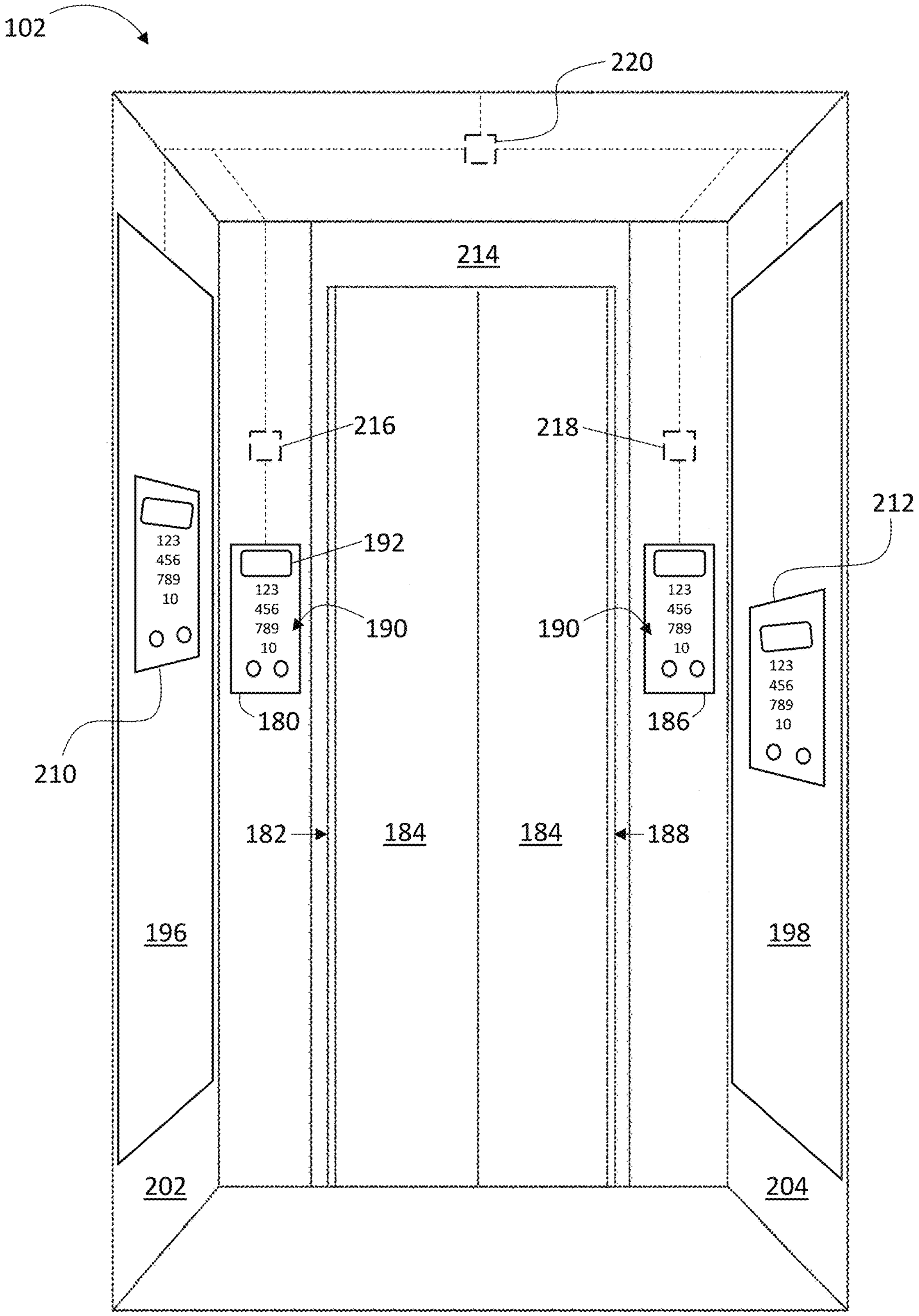
FIG. 3 is a back view of an inside of an example elevator car, shown from an inside of the elevator car looking towards doors of the elevator car.
Figure 4:
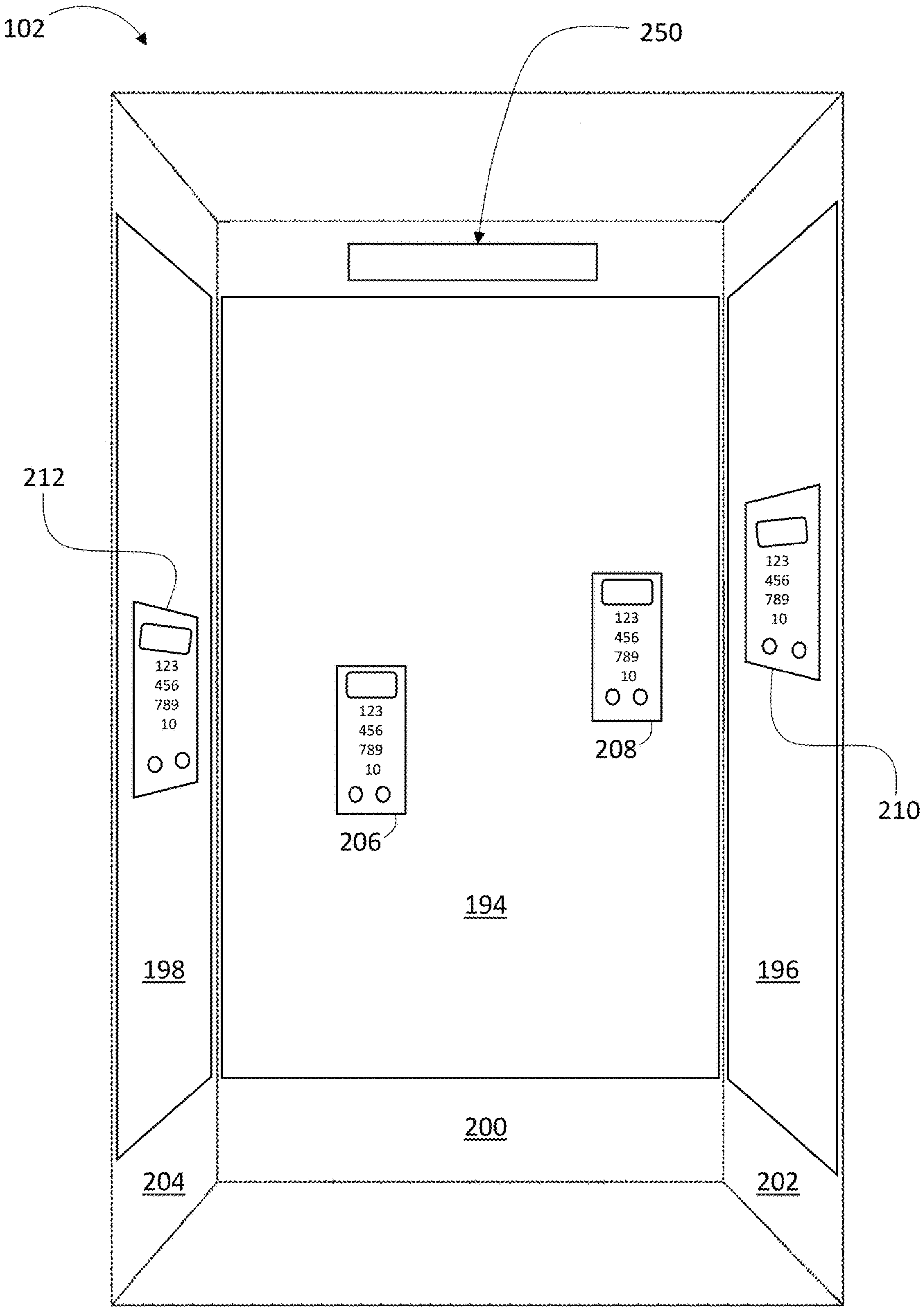
FIG. 4 is a front view of the inside of the elevator car shown in FIG. 3, shown from an outside of the elevator car looking into the elevator car.

In some examples, such as the example elevator car 102 shown in FIG. 3 (inside looking out) and FIG. 4 (outside looking in), a first car operating panel (COP) 180 may be disposed on a first side 182 of doors 184 of the elevator car 102. The elevator car 102 may in some cases include a second COP 186 disposed on a second side 188 of the doors 184 of the elevator car 102. The first and/or second COPs 180, 186 may be electromechanical operating panels that include buttons 190 (e.g., floor buttons, door open/close buttons, emergency buttons, stop elevator buttons, alarm buttons), keypads, digital displays 192, and the like. However, the elevator car 102 may further include one or more screens 194, 196, 198 disposed on its sidewalls 200, 202, 204, each of which screens 194, 196, 198 is interactive and can display one or more virtual display panels 206, 208, 210, 212, such as virtual COPs, for example. The screens 194, 196, 198 may be, for example, touchscreens, screens with light curtains, and/or screens with time-of-flight cameras. Although the example elevator car 102 shown in FIGS. 3 and 4 includes three screens 194, 196, 198, those having ordinary skill in the art will recognize that elevator cars may include any number of screens, such as one, two, four, five, six, seven, eight, nine, ten, etc. In some examples where screens 194, 196, 198 are employed in an elevator car, the elevator car may not include any electromechanical COPs 180, 186 as the screens 194, 196, 198 allow passengers at all locations within the elevator car to perform all operations that may otherwise occur at the electromechanical COPs. The first and/or second electromechanical COPs 180, 186 may be replaced with one or more screens on a sidewall 214 of the elevator car 102 in which the doors 184 are positioned. And although the virtual display panels 206, 208, 210, 212 on the screens 194, 196, 198 may have the same appearance as the first and second COPs 180, 186, particularly when the virtual display panels 206, 208, 210, 212 are configured as virtual COPs, those having ordinary skill in the art will understand that the virtual display panels 206, 208, 210, 212 may be configured to have completely different appearances than the first and second COPs 180, 186 in some cases.

Although the preceding paragraph identifies a virtual COP as a primary example of a virtual display panel, those having ordinary skill in the art will recognize that the virtual display panels 206, 208, 210, 212 may take many other forms. The virtual display panels 206, 208, 210, 212 may display information concerning, for example and without limitation, maintenance, service modes (e.g., maintenance, fire service, VIP, out of service), elevator performance (e.g., elevator efficiency, current speed, electricity usage, number of passengers transported, height above ground level), estimated time to destination, registered call floors, and/or pin code input.

In some examples, the screens 194, 196, 198 may share a controller with the first and/or second COPs 180, 186. In other examples, the screens 194, 196, 198 may each have their own screen controllers that are in wired or wireless communication with one or more COP controllers 216, 218 of the first and/or second COPs 180, 186. In yet other examples, the screens 194, 196, 198 may share a screen controller 220 that is in communication with the COP controllers 216, 218 of the first and/or second COPs 180, 186, as shown in FIG. 3 (but not in FIG. 4). The screen controller 220; the COP controllers 216, 218; and the elevator controller 112 may include various electronic components including processors, memory, buses, communication elements, input/output ports, and so on. As disclosed further below, the screen controller 220 may be configured to control the screens 194, 196, 198 to display a wide variety of content. Further, it should be understood that the screens 194, 196, 198 can be installed when an elevator car is first manufactured or retroactively to pre-existing elevator cars.

In some examples, each of the screens 194, 196, 198 may comprise a pressure sensitive surface that is configured as a touchscreen to receive input from a passenger that presses against the pressure sensitive surface. The touchscreen may employ at least one of capacitive technology, resistive technology, infrared technology, or surface acoustic wave technology. In some cases, the pressure-sensitive surface is an LED-backlit piece of tempered glass or chemically-strengthened glass (e.g., alkali-aluminosilicate sheet glass) that is reflective and can selectively display everything from images and video to virtual objects such as buttons. Several example touch-based technologies that the screens 194, 196, 198 may employ include without limitation capacitive touch, infrared, optical imaging, dispersive signal, and/or acoustic pulse recognition technologies. In some cases, the pressure sensitive surface may be scratch-resistant and may have a Vickers hardness of 650+. Nonetheless, input from a passenger to the pressure sensitive surface may be processed by the screen controller 220. The screen controller 220 may then transmit a control signal to the elevator controller 112. Alternatively, input from a passenger received at the screens 194, 196, 198 may be processed by the elevator controller 112. In most or all cases, the screens 194, 196, 198 provide feedback to indicate to a passenger that certain input has been received. For example and without limitation, a floor button displayed on each of the virtual display panels 206, 208, 210, 212 may light up as having been requested to indicate to passengers within the elevator car 102 that a particular floor has been requested and that the elevator car 102 will stop at the requested floor.

In some examples, one or more of the virtual display panels 206, 208, 210, 212—and other content of the screens 194, 196, 198—may be displayed at positions on the screens 194, 196, 198 that are based on the location, orientation, and/or height of one or more passengers that is entering or already present within the elevator car 102. A sensor system 250 may detect the presence, location, orientation, and/or height of each passenger. The screens 194, 196, 198 may then display the virtual display panels 206, 208, 210, 212 and other content at an ideal location for each respective passenger, as the sensor system 250 may be in communication with the elevator controller 112 and/or the screen controller 220. The sensor system 250 may in some examples be disposed above the first screen 194 on the back sidewall 200 of the elevator car 102. In other examples, the sensor system 250 may be disposed above the screen 198 on the left sidewall 204, above the screen 196 on the right sidewall 202, above the first COP 180, above the second COP 186, above the doors 184, and/or on a ceiling of the elevator car 102. In some cases, components of the sensor system 250 may be distributed throughout various locations in the elevator car 102. In some instances, the sensor system 250, or at least one component thereof, may be disposed in or behind one of the screens 194, 196, 198 so as to remain largely or entirely out of view of any passengers.

Figure 5:
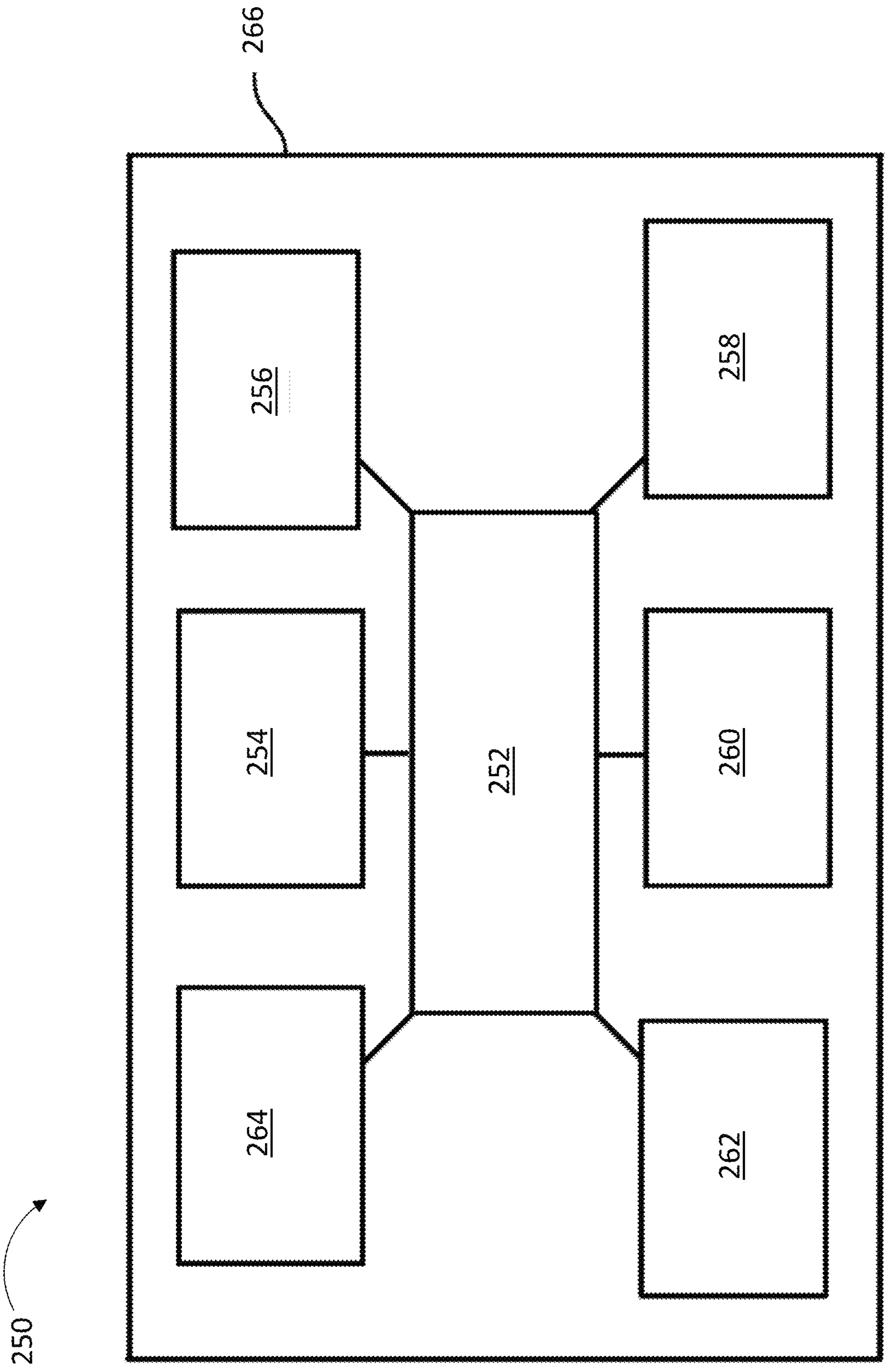
FIG. 5 is a schematic view of an example sensor system.

In some examples, the sensor system 250 may be at least similar to one of the example traffic monitoring systems disclosed in WIPO Patent Publication No. WO2019/043061A1 entitled "Elevator Traffic Monitoring and Control System," which is hereby incorporated by reference in its entirety. FIG. 5 shows a schematic of one example sensor system 250. The sensor system 250 may include a processor 252 that is in communication with one or more sensors configured to record image and position data of the elevator car 102. The sensor system 250 may include an object detection sensor 254 that is in communication with the processor 252. The object detection sensor 254 may include a camera, an infrared sensor, a depth sensor, and/or combinations thereof, for example and without limitation. In some cases, the sensor system 250 further includes a location sensor 256 that is in communication with the processor 252. The location sensor 256 may include a barometer, an accelerometer, a gyroscope, an altimeter, and/or a GPS sensor. The sensor system 250 may further include a transceiver 258 that is in communication with the processor 252 and configured to facilitate communication between the sensor system 250 and other components of the elevator system 100, such as the elevator controller 112; the screen controller 220; the COP controllers 216, 218; the call panels 114, 116; and/or an alarm system, for instance. The sensor system 250 may further include a non-transitory computer-readable medium 260 with instructions that are executable by the processor 252. The sensor system 250 may further include a storage medium 262 for storing data obtained and/or generated by the processor 252, the object detection sensor 254, and the location sensor 256. The sensor system 250 may further include a power source 264, such as a battery, for supplying power to the components of the sensor system 250. The various components of the sensor system 250 may be at least partially enclosed within a housing 266 that is mountable inside the elevator car 102.

Figure 6:
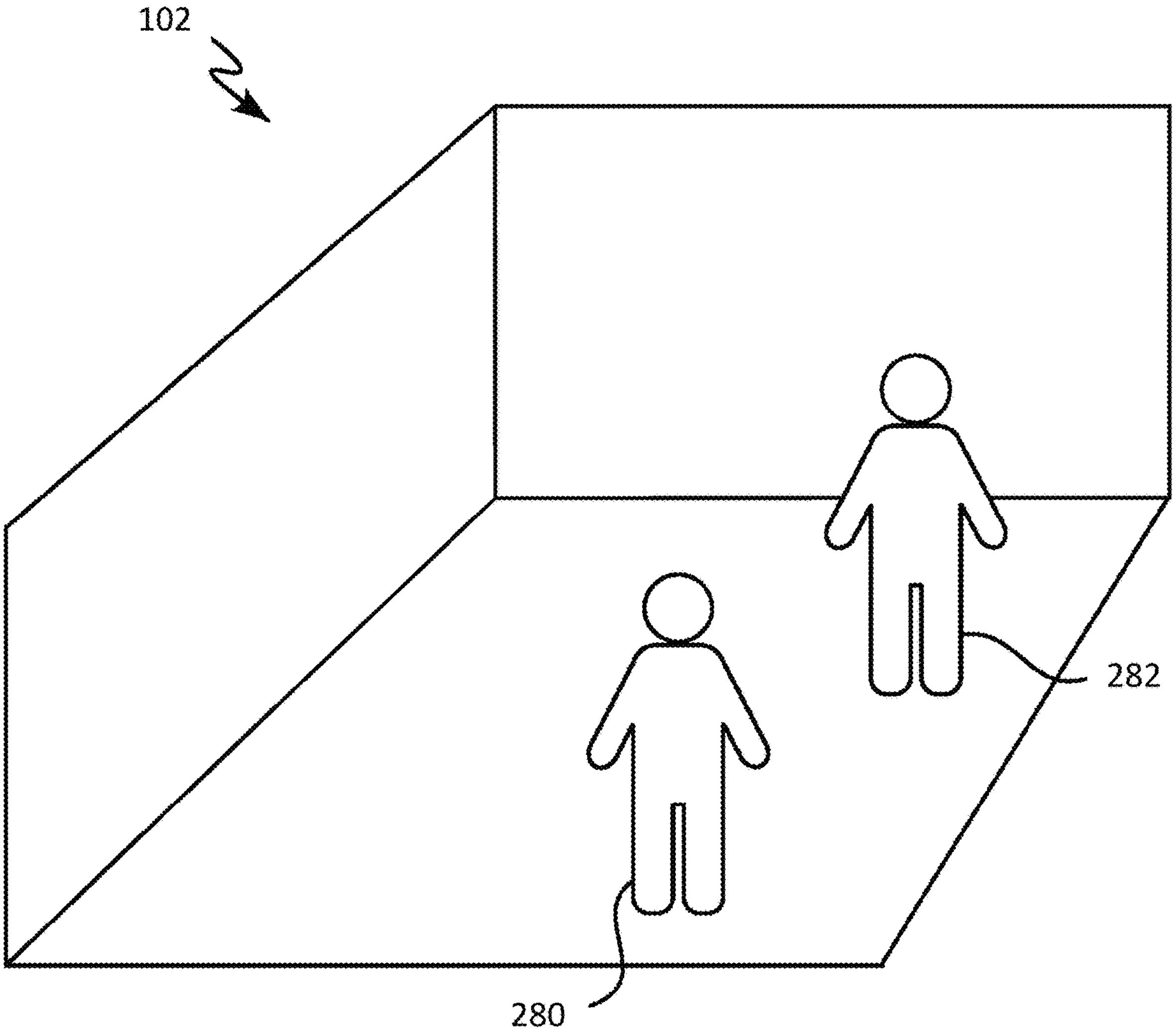
FIG. 6 is a schematic perspective view of the example elevator car with two passengers.

One of the components of the sensor system 250 such as the object detection sensor 254 may detect one or more passengers 280, 282 that are entering or already present in the elevator car 102, as shown in FIG. 6. During operation of the elevator system 100, each of the passengers 280, 282 may enter and exit the elevator car 102 at any floor 104, 106. Further, the sensor system 250 may be configured to generate images 300, 302 of the passengers 280, 282 occupying the elevator car 102, as shown respectively in FIGS. 7 and 8. As disclosed previously, the sensor system 250 may be mounted in an upper portion of the elevator car 102. Hence the images 300, 302 may be generated by, for example, acquiring images from an object detection sensor disposed on a ceiling of the elevator car 102 or combining images acquired from multiple object detection sensors disposed at more than one location in the elevator car 102.

Figure 7:
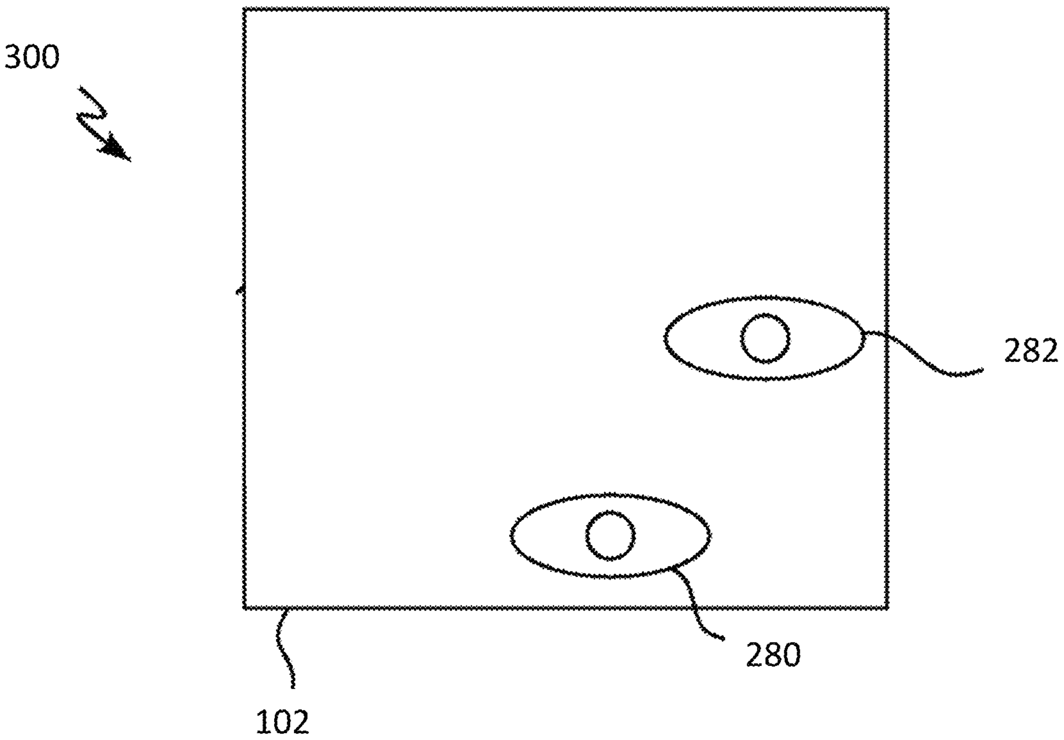
FIG. 7 is an example top view photographic image of the elevator car generated by a sensor system that includes a camera.
Figure 8:
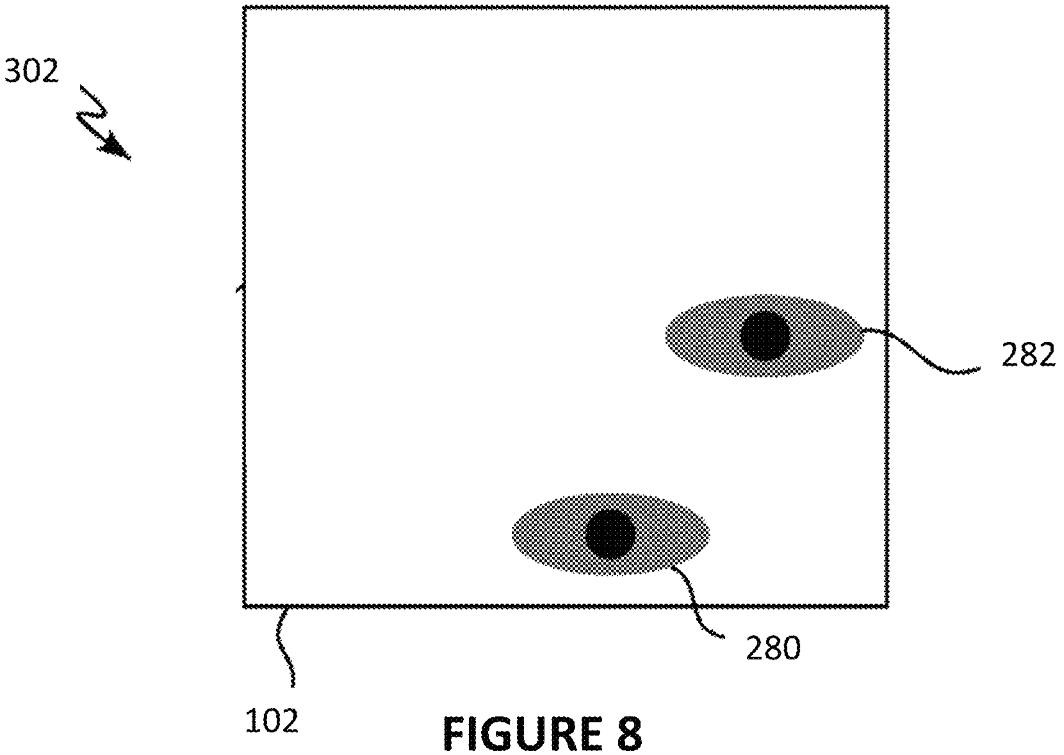
FIG. 8 is an example top view thermal image of the elevator car generated by a sensor system that includes an infrared sensor.
Figure 9:
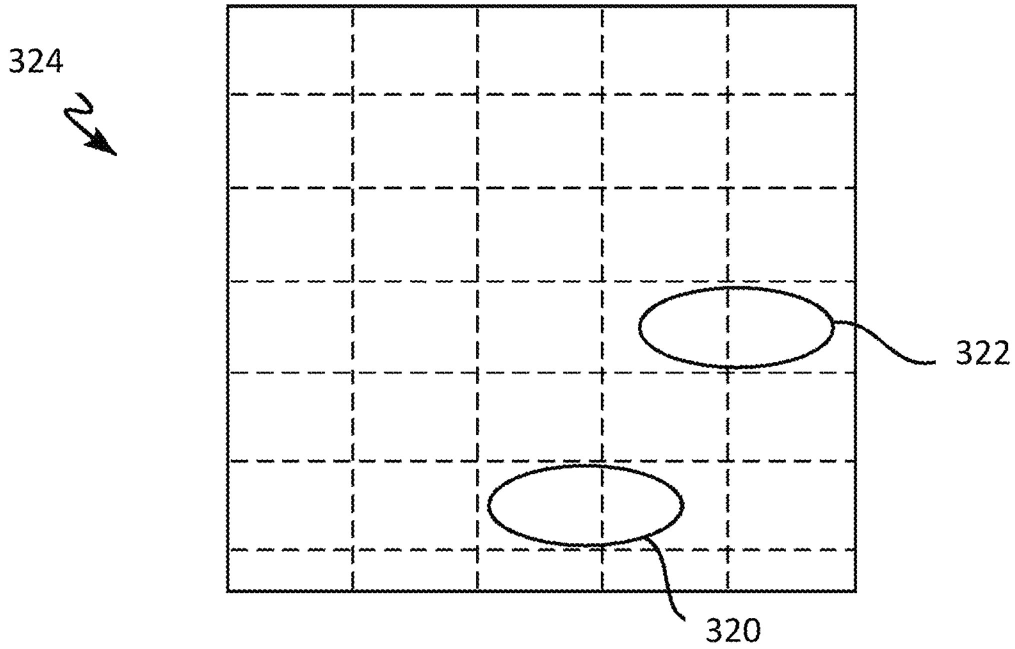
FIG. 9 is an example map that has been generated by a processor of a sensor system based on the example photographic image shown in FIG. 7.
Figure 10:
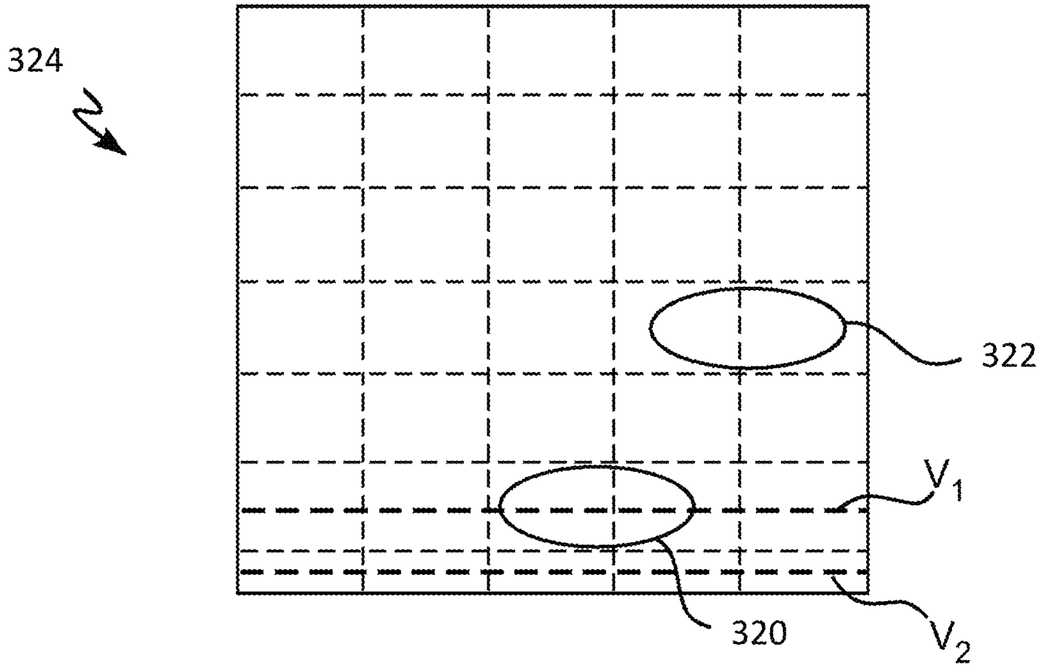
FIG. 10 is an example map that has been generated by a processor of a sensor system based on the example thermal image shown in FIG. 8.

The example image 300 of FIG. 7 is an example photographic image generated by the sensor system 250 in an example where the object detection sensor 254 includes a camera. The image 300 therefore appears to at least resemble a view of the elevator car 102 as would be perceived by a human eye looking down on the elevator car 102. Using an image recognition algorithm, for instance, the processor 252 of the sensor system 250 may identify elements in the image 300 as the passengers 280, 282 occupying the elevator car 102. Conversely, the image 302 of FIG. 8 is an example thermal image generated by the sensor system 250 in an example where the object detection sensor 254 includes an infrared sensor. The image 302 depicts each of the passengers 280, 282 of the elevator car 102 based on the infrared or thermal radiation emitted from the passengers 280, 282. Using a heat signature recognition algorithm, for instance, the processor 252 of the sensor system 250 may identify elements in the image 302 as the passengers 280, 282 occupying the elevator car 102. Regardless of which example imaging technique is used, the processor 252 may then plot signatures 320, 322 corresponding to each of the passengers 280, 282 on a map 324 as shown in FIGS. 9 and 10.

In some examples, the object detection sensor 254 may include a depth sensor that generates an image of the passengers 280, 282 occupying the elevator car 102 based on the proximity of the passengers 280, 282 to the object detection sensor 254. The processor 252 may use an algorithm to generate a map, much like the map 324 of FIGS. 9 and 10, by identifying elements in the image as the passengers 280, 282 occupying the car 102 and plotting signatures of each of the passengers 280, 282 on the map. One having ordinary skill in the art will also understand how such depth sensors may be employed in a ceiling of the elevator car 102, for example, to determine respective passenger heights.

It should be understood that the sensor system 250 may include numerous object detection sensors 254 of the same or different types to verify detection of the passengers 280, 282 entering or present in the elevator car 102. As an example where the sensor system 250 includes numerous object detection sensors 254 of the same type, the sensor system 250 may include four imaging luminance meters configured as the object detection sensors 254 and disposed about the walls of the elevator car 102. Luminance generally refers to an amount of light that is emitted, passed through, or reflected from a surface. Because the luminance of a passenger's face is distinguishable from the luminance of the back of the passenger's head, the processor 252 of the sensor system 250 can compare four contemporaneous (or near-contemporaneous) measurements from the four different imaging luminance meters in the elevator car 102 and determine the passenger's orientation.

As an example where the sensor system 250 includes numerous object detection sensors 254 of different types, the sensor system 250 may include a camera as a first object detection sensor 254 and an infrared sensor as a second object detection sensor 254. The camera and the infrared sensor may contemporaneously generate, respectively, the photographic image 300 of FIG. 7 and the thermal image 302 of FIG. 8. The processor 252 may utilize both the photographic image 300 and the thermal image 302 to generate the map 324 of FIGS. 9 and 10, thereby increasing the accuracy of the map 324. That is, each element identified in the photograph image 300 may be verified as the passengers 280, 282 in the elevator car 102 by identification of the same element in the thermal image 302, or vice versa. Conversely, if an element is identified in only one of the photographic image 300 or the thermal image 302, the processor 252 may execute a resolution algorithm to determine whether the identified elements are actually the passengers 280, 282 in the elevator car 102. In this manner, the accuracy of the map 324 and subsequent analyses based thereon may be enhanced. More generally, each object detection sensor 254 may generate an image of an interior space of the elevator car 102 from a different viewpoint, and the images generated by the object detection sensors 254 may be compared with one another via the processor 252 using an algorithm to compile the images into the map 324, thereby resolving inconsistencies between the images and improving the accuracy of the map 324.

Those having ordinary skill in the art will appreciate that the object detection sensor 254 and the sensor system 250 generally may update the map 324 periodically (e.g., every few seconds, every second, every few tenths of a second, every few hundredths of a second, etc.). To account for any passenger movement within, into, or out of the elevator car 102, the map 324 may in some examples be updated with virtual lines or vectors indicating movement of the signatures 320, 322 and hence the passengers 280, 282 relative to the elevator car 102. In this manner, specific movement of individual passengers 280, 282 may be determined. As shown in FIG. 10, for example, a first vector $V_1$ may be added to the map 324 immediately adjacent to and parallel to a location of the door 184. A second vector $V_2$ may be added to the map 324 parallel to the first vector $V_1$ and at a distance further inside the elevator car 102 than the first vector $V_1$. If the signature 320 crosses the first vector $V_1$ before crossing the second vector $V_2$, then the signature 320 and thus the passenger 280 may be determined to be entering the elevator car 102. If the signature 320 crosses the second vector $V_2$ before crossing the first vector $V_1$, then the signature 320 and thus the passenger 280 may be determined to be exiting the elevator car 102. One having ordinary skill in the art will appreciate how such determinations may be advantageous when determining whether to cause a virtual display panel 206, 208, 210, 212 to appear, fade away, or move based on a passenger's movement relative to the elevator car 102.

The present disclosure is not limited to identifying the locations of passengers by way of imaging. Rather, the present disclosure contemplates a wide variety of ways by which to identify the location, height, orientation, and/or movement of passengers in the elevator car 102. As merely an example, the sensor system 250 may employ object detection sensors in the form of infrared transmitters and receivers (or "transceivers") disposed about the walls of the elevator car 102 behind or in the screens 194, 196, 198. The infrared transmitters and receivers may be disposed about the walls of the elevator car 102 such that channeled infrared light paths form a horizontal grid across the elevator car 102. Vertical grids may be utilized as well. Because passengers standing in the elevator car 102 will obstruct one or more of the channeled infrared light paths, the sensor system 250 is able to deduce which portions of the elevator car 102 are occupied by passengers. Moreover, to determine the heights of the various passengers, the sensor system 250 may employ infrared transmitters and receivers disposed at multiple distinct horizontal levels about the walls of the elevator car 102.

The sensor system 250 may periodically provide information to the screen controller 220 and/or the elevator controller 112 regarding the height, position, movement, and/or orientation of any passengers. For each passenger 280, 282 that enters or is present in the elevator car 102, the screen controller 220 may display a virtual display panel 206, 208, 210, 212 at a location on the screens 194, 196, 198 that is most appropriate for each passenger. In some scenarios, most appropriate may mean that a virtual display panel 206, 208, 210, 212 is displayed at a location on one of the screens 194, 196, 198 that is horizontally closest to the passenger and at a height that is approximately chest- or shoulder-level high for that passenger.

The present disclosure contemplates a host of methods for operating the example screens 194, 196, 198 in the elevator car 102. As one example method, the screens 194, 196, 198 may be configured in a sleep mode to conserve energy while no passengers are present in the elevator car 102. The screens 194, 196, 198 may awaken and display several virtual display panels 206, 208, 210, 212 spaced out about the elevator car 102 at one or more periods of time, such as (i) just prior to the opening of the doors 184 of the elevator car 102 to receive passengers, (ii) as the doors 184 open, (iii) when motion is detected within the elevator car 102, and/or (iv) when a passenger touches one of the screens 194, 196, 198. Based on the height, position, movement, and/or orientation of the passenger(s) as determined by the sensor system 250, the screen controller 220 may adjust the position of at least one of the virtual display panels 206, 208, 210, 212. In another example, though, the screen controller 220 may wait to display one or more of the virtual display panels 206, 208, 210, 212 until the sensor system 250 has provided information regarding the passenger's height, position, movement, and/or orientation in the elevator car 102.

In still another example method, the screen controller 220 may wait until a passenger interacts with or touches one of the screens 194, 196, 198 before causing the screens 194, 196, 198 to display a virtual display panel. The screens 194, 196, 198 may then display a virtual display panel 206, 208, 210, 212 at a spot where the passenger first interacted with or touched one of the screens 194, 196, 198. According to this method, the screens 194, 196, 198 may display one or more hands, fingertips, or text such as "touch here" as visual prompts for passengers to touch one of the screens 194, 196, 198 when entering the elevator car 102.

To be clear, the screens 194, 196, 198 may display a virtual display panel 206, 208, 210, 212 for each passenger based on each passenger's height, position, movement, and/or orientation in the elevator car 102. Furthermore, each virtual display panel 206, 208, 210, 212 that is displayed may be updated based on the input of co-passengers in the elevator car 102. For instance, if a first passenger requests to stop at a first destination floor on the first virtual display panel 206, the second virtual display panel 208 may inform a second passenger that the elevator car 102 will stop at the first destination floor by, for example, illuminating a virtual button that corresponds to the first destination floor and/or by highlighting the first destination floor on a virtual projection of the building. The virtual display panels 206, 208, 210, 212 may also inform passengers about scheduled stops that have been requested by passengers that are waiting to be picked up and have yet to enter the elevator car 102.

In some cases, the virtual display panels 206, 208, 210, 212 may remain displayed on the screens 194, 196, 198 even after a passenger has stopped engaging with the screens 194, 196, 198. For example, the first virtual display panel 206 may remain displayed until the first passenger that interacted with the first virtual display panel 206 reaches his or her destination. In other cases, however, each virtual display panel 206, 208, 210, 212 may, respectively, fade on the screens 194, 196, 198 after a period of inactivity (e.g., five seconds, ten seconds, fifteen seconds) where no passengers engage with the respective virtual display panel 206, 208, 210, 212.

Because the screen controller 220 and/or the elevator controller 112 are connected to the Internet (or an intranet that is otherwise connected) by way of a wired or wireless connection, the screens 194, 196, 198 may display, in addition to the virtual display panels 206, 208, 210, 212, an array of media content such as notifications, advertisements, social media, photos, web pages, news briefs, weather forecasts, traffic reports, video clips, and so on. Likewise, this media content may be managed remotely and may be updated continuously, periodically, or at least intermittently with little or no human intervention. Further, the screens 194, 196, 198 may display such media content at the same time as the virtual display panels 206, 208, 210, 212, for instance, alongside, above, and/or below the virtual display panels 206, 208, 210, 212. As one example, media content appropriate for children may be displayed in the lower third of the screens 194, 196, 198, beneath one or more virtual display panels 206, 208, 210, 212. Alternatively or additionally, the screens 194, 196, 198 may display media content for a passenger after the passenger has selected a destination on a virtual display panel 206, 208, 210, 212 and after that virtual display panel 206, 208, 210, 212 fades. In some instances, the media content that is displayed may be based at least in part on the destination that is selected. As an example, if the ninth floor of a building is leased by a trading firm and a passenger requests to travel to the ninth floor, the screens 194, 196, 198 may display financial news after the passenger makes the destination request.

The aforementioned examples of media content that the screens 194, 196, 198 may offer are not in any way limiting. For instance, if a passenger so desires, the object detection sensor 254 of the sensor system 250 or a camera disposed in or behind the screens 194, 196, 198 may enable the elevator car 102 to serve as a photobooth or GIF generator. In some cases, the photobooth or GIF entertainment options may only be available where a single destination is selected and/or where all passengers in the elevator car 102 provide their consent. Directions and timing for the photobooth or GIF generator may be displayed on the screens 194, 196, 198. Photos and/or the GIF file(s) acquired during the trip may then be sent to the passenger's mobile phone number or email, for instance, which may be entered into the screen 194, 196, 198. Alternatively, the photos and/or GIF file(s) may be posted directly to a social media platform of the passenger's choosing. Still further alternatively, the screens 194, 196, 198 may display a QR code, which passengers can capture to retrieve their photos and/or GIF file(s).

In some cases, the screens 194, 196, 198 may display easy access buttons that enable passengers to engage with the most popular types of media content with little to no virtual navigation. Example easy access buttons may concern news and traffic. However, easy access buttons may change depending on the time of day (e.g., lunch suggestions around lunchtime) and/or depending on the forecast (e.g., the weather report when precipitation is expected). In some cases, the screens 194, 196, 198 may even have fingerprint scanners embedded in certain locations. When a passenger enters the elevator car 102 and has his or her fingerprint scanned, the elevator controller 112 may instruct the elevator car 102 to transport the passenger to his or her regular floor, and the screen controller 220 may cause the screens 194, 196, 198 to display the passenger's preferred media content.

In some cases, the screen controller 220 may even "learn" certain passenger's preferences by way of repetition, particularly passengers who utilize the elevator car 102 to reach floors in tall buildings during non-peak hours. By way of example, if each weekday between 7:04-7:07 A.M. a passenger requests that the elevator car 102 transport him or her to the eighteenth floor, the screen controller 220 may eventually start to "know" to display (or seek confirmation to display) local sports highlight clips after the passenger selects the eighteenth floor on a virtual display panel 206, 208, 210, 212 on weekdays between 7:04-7:07 A.M.

Alternatively, in some cases the screen controller 220 may be more direct about a passenger's preferences. As merely an example, the screen controller 220 may identify a frequent passenger and, at least initially, cause the virtual display panels 206, 208, 210, 212 to query the frequent passenger for content preferences (e.g., entertainment; money; lifestyle; health; travel; sports; medicine; science; local news; global news; weather). Of course, these examples of content are not remotely limiting, and each example type of content may have a multitude of subcategories. For instance, choosing entertainment may allow the frequent passenger to further specify preferences for a particular type of social media, trending videos, word challenges, brain games, trivia, pop culture, and/or video games, again, purely as examples. Each time the passenger uses the elevator car 102 thereafter, the virtual display panels 206, 208, 210, 212 may automatically display the passenger's preferred content so long as the screen controller 220 is able to identify the passenger. The virtual display panels 206, 208, 210, 212 may routinely or occasionally provide an option for the passenger to update his or her content preferences. In some instances where numerous passengers are in the elevator car 102, the passenger who has previously specified content preferences may be prompted to confirm his or her identity and/or location within the elevator car 102 before his or her preferred content is displayed. Likewise, in some instances where the elevator system 100 identifies numerous frequent passengers that have previously specified content preferences in the elevator car 102, the virtual display panels 206, 208, 210, 212 may display content that is preferred by the greatest number of passengers, particularly where there is not enough space on the virtual display panels 206, 208, 210, 212 to display preferred content for each passenger. In other instances, the virtual display panels 206, 208, 210, 212 may still display preferred content for each passenger, but may prioritize (e.g., enlarge, broadcast associated audio, display centrally) content that is preferred by the greatest number of passengers.

Still further, the screens 194, 196, 198 may be utilized by service technicians when the elevator system 100 is being serviced. After the elevator car 102 is removed from service (which may occur via the screens 194, 196, 198 in some examples) and/or a service technician enters his or her credentials (e.g., username, password, authorization code, two-step authentication info) via the screens 194, 196, 198, the screens 194, 196, 198 may display manuals, step-by-step instructions, documents, instructional images/videos, two-way video calls, service history, statistical ride data, historical ride data, predictive maintenance information, and so on to assist the service technician and facilitate the servicing of the elevator system 100. Much or all of this information may not be available to passengers of the elevator system 100. Such functionality may be particularly advantageous when the service technician is working at a location where the service technician has a view inside the elevator car 102.

What is claimed is:

1. An elevator system comprising:

an elevator car having a plurality of walls and is configured to transport a first passenger between floors of a building;

a sensor system disposed in the elevator car, the sensor system being configured to detect a location and an orientation of the first passenger with respect to at least one of the plurality of walls; and a screen disposed in the elevator car, wherein the screen is configured to receive input from the first passenger, wherein the screen is configured to display a first virtual display panel at a location on the screen that is based on the location and the orientation of the first passenger.

2. The elevator system of claim 1, wherein the screen is configured to display at the same time the first virtual display panel for the first passenger and a second virtual display panel for a second passenger, wherein the second virtual display panel is configured to be displayed at a location on the screen that is based on at least one of a location, an orientation with respect to at least one of the plurality of walls, or a height of the second passenger, which is detectable with the sensor system.

3. The elevator system of claim 1 comprising:

an elevator controller that controls movement of the elevator car between the floors of the building; and a screen controller that controls content for display on the screen, wherein the screen controller is in communication with the elevator controller.

4. The elevator system of claim 1 wherein the screen is a touchscreen that employs at least one of capacitive technology, resistive technology, infrared technology, or surface acoustic wave technology, wherein the first virtual display panel is a first virtual car operating panel.

5. The elevator system of claim 1 wherein the sensor system comprises object detection sensors that are disposed at different locations in the elevator car.

6. The elevator system of claim 1 wherein an object detection sensor of the sensor system comprises a camera, a depth sensor, or an infrared sensor.

7. The elevator system of claim 1 wherein object detection sensors of the sensor system comprise imaging luminance meters, wherein the location at which the screen is configured to display the first virtual display panel is based on the orientation of the first passenger in the elevator car.

8. The elevator system of claim 1 wherein the screen is configured to display the first virtual display panel before the first passenger enters the elevator car, wherein once the first passenger enters the elevator car the screen adjusts a position of the first virtual display panel to the location on the screen that is based on the location and the orientation of the first passenger, wherein the first virtual display panel is a first virtual car operating panel.

9. The elevator system of claim 1 wherein the screen is configured to display the first virtual display panel only after the sensor system has provided information to a screen controller of the screen regarding the location and the orientation of the first passenger in the elevator car.

10. The elevator system of claim 1 wherein the screen is configured to display media content that is based on a destination floor that the first passenger selects or that is based on a preference of the first passenger.

11. The elevator system of claim 1 wherein the screen is configured to display media content after the first passenger selects a destination floor on the first virtual display panel and after the first virtual display panel fades from the screen.

12. The elevator system of claim 1 wherein the screen and the sensor system cooperate as a photobooth or as a GIF generator, wherein media that is captured by the sensor system and that features the first passenger is transmittable to the first passenger.

13. The elevator system of claim 1 wherein when the elevator system is taken out of service the screen is configured to display information that assists a service technician in servicing the elevator system.

14. A method of operating a screen in an elevator car having a plurality of walls, the method comprising:

detecting a location and an orientation with respect to at least one of the plurality of walls of a passenger in the elevator car;

displaying a virtual display panel at a location on the screen that is based on the location and the orientation of the passenger; and receiving input from the passenger regarding a destination floor via the virtual display panel on the screen.

15. The method of claim 14 comprising:

displaying at a position on the screen the virtual display panel before the passenger enters the elevator car; and moving the virtual display panel to the location on the screen that is based on the location and the orientation of the passenger once the passenger enters the elevator car.

16. The method of claim 14 comprising:

displaying the virtual display panel only after detecting the location and the orientation of the passenger in the elevator car.

17. The method of claim 14, comprising:

displaying media content at least one of above, below, or alongside the virtual display panel, wherein the virtual display panel is a virtual car operating panel.

18. The method of claim 14 comprising:

removing the virtual display panel from the screen after receiving input regarding the destination floor; and displaying media content at the location on the screen where the virtual display panel was displayed after the virtual display panel is removed from the screen.

19. The method of claim 14 comprising:

operating the elevator car as a photobooth or a GIF generator; and offering via the screen to transmit to the passenger media that is captured in the elevator car and that features the passenger.

20. The method of claim 14 comprising:

removing the elevator car from service; and displaying on the screen information that is unavailable to the passenger and that assists a service technician in servicing the elevator system.

21. An elevator system comprising:

an elevator car configured to transport a passenger between floors of a building; and a screen disposed in the elevator car, wherein the screen is configured to receive input from the passenger, wherein the screen is configured to display a virtual display panel only after the passenger interacts with or touches the screen, wherein the screen is configured to display the virtual display panel at a location where the passenger first interacts with or touches the screen.

22. The elevator system of claim 21 wherein before the passenger interacts with or touches the screen, the screen is configured to display a visual prompt for the passenger to interact with or touch the screen.

* * * * *